US009091040B2

(12) United States Patent
Peterson et al.

(10) Patent No.: US 9,091,040 B2
(45) Date of Patent: Jul. 28, 2015

(54) HYDRAULIC CIRCUIT CONTROL (75) Inventors: Jeremy T. Peterson, Washington, IL (US); Bryan E. Nelson, Lacon, IL (US)

(73) Assignee: Caterpillar Inc., Peoria, IL (US)

( * ) Notice: Subject to any disclaimer, the term of this patent is extended or adjusted under 35 U.S.C. 154(b) by 416 days.

(21) Appl. No.: 13/563,870

(22) Filed: Aug. 1, 2012

(65) Prior Publication Data

US 2014/0033691 A1 Feb. 6, 2014

(51) Int. Cl.
| F16D 31/02 | (2006.01) |
| F15B 11/02 | (2006.01) |
| E02F 9/22 | (2006.01) |
| F16H 61/431 | (2010.01) |
| F16H 61/438 | (2010.01) |
| F01P 7/04 | (2006.01) |

(52) U.S. Cl.
CPC ............ *E02F 9/2217* (2013.01); *E02F 9/226* (2013.01); *E02F 9/2235* (2013.01); *E02F 9/2285* (2013.01); *E02F 9/2289* (2013.01); *E02F 9/2296* (2013.01); *F16H 61/431* (2013.01); *F16H 61/438* (2013.01); *F01P 7/044* (2013.01)

(58) Field of Classification Search
CPC ... F16H 61/44; F16H 61/444; F16H 61/4017; F16H 61/438; F16H 61/4078; F16H 61/4035; F16H 61/4008; F16H 61/4043; F16H 61/4069; F16H 61/4104; F16H 61/4139
USPC ........... 60/443, 444, 483, 487, 489, 490, 491, 60/492, 488, 464
See application file for complete search history.

(56) References Cited

U.S. PATENT DOCUMENTS

| 3,808,811 | A | * | 5/1974 | Lepelletier | 60/444 |
| 4,211,079 | A | | 7/1980 | Saele et al. | |
| 4,468,173 | A | | 8/1984 | Dantlgraber | |
| 5,121,603 | A | * | 6/1992 | Widemann | 60/447 |
| 5,319,933 | A | | 6/1994 | Omberg et al. | |
| 5,823,072 | A | * | 10/1998 | Legner | 74/733.1 |
| 5,884,480 | A | | 3/1999 | Dahl et al. | |
| 6,378,303 | B1 | * | 4/2002 | Higuchi et al. | 60/468 |
| 6,405,530 | B1 | * | 6/2002 | Brimeyer et al. | 60/444 |
| 6,499,296 | B1 | | 12/2002 | Weickert et al. | |
| 6,662,558 | B1 | | 12/2003 | Nelson | |
| 6,837,046 | B2 | | 1/2005 | Gollner | |
| 6,971,463 | B2 | * | 12/2005 | Shore et al. | 180/165 |
| 7,240,486 | B2 | * | 7/2007 | Huang et al. | 60/413 |
| 7,614,226 | B2 | * | 11/2009 | Legner | 60/483 |
| 7,690,471 | B2 | * | 4/2010 | Hanamoto | 180/282 |
| 7,954,316 | B2 | | 6/2011 | Sakata et al. | |
| 8,646,263 | B2 | * | 2/2014 | Shirao | 60/327 |
| 2007/0101708 | A1 | * | 5/2007 | Ohigashi et al. | 60/431 |

* cited by examiner

*Primary Examiner* — Nathaniel Wiehe
*Assistant Examiner* — Dustin T Nguyen
(74) *Attorney, Agent, or Firm* — Finnegan, Henderson, Farabow, Garrett & Dunner, LLP (57) ABSTRACT

A hydraulic circuit is provided. The hydraulic circuit includes a primary pump, a displacement actuator, a charge pump, a direction control valve, and a pressure control valve. The displacement actuator is associated with the primary pump. The charge pump is configured to generate a flow of a pilot fluid. The direction control valve is configured to control the flow of the pilot fluid to the displacement actuator to affect a movement direction of the displacement actuator. The pressure control valve is configured to control a pressure of the pilot fluid to affect a movement amount of the displacement actuator. Further, the hydraulic circuit includes a controller. The controller is configured to control the direction and the pressure control valves to adjust a displacement of the primary pump based at least on one of a sensed engine parameter or a mode of operation of the primary pump.

19 Claims, 3 Drawing Sheets

HYDRAULIC CIRCUIT CONTROL

TECHNICAL FIELD

The present disclosure relates generally to a hydraulic circuit, and more particularly, to a control of the hydraulic circuit.

BACKGROUND

Hydraulic circuits make use of a combination of valves to facilitate flow control in a system. U.S. Pat. No. 5,319,933 relates a hydraulic circuit for controlling the speed of multiple hydraulic fluid power devices when the flow demand of the devices exceeds the flow capacity of a pressure source supplying hydraulic fluid under pressure to the devices. The hydraulic circuit includes multiple pressure controlled proportional flow supply valves for controlling the supply of hydraulic fluid to the power devices. In the preferred embodiment, the pilot pressure is regulated by the proportional speed sensing valve to be equal to the differential between the supply pressure and the highest load sense pressure, and a limit control is provided in one form of the proportional speed sensing valve.

SUMMARY OF THE DISCLOSURE

In one aspect, the present disclosure provides a hydraulic circuit including a primary pump, a displacement actuator, a charge pump, a direction control valve, and a pressure control valve. The displacement actuator is associated with the primary pump. The charge pump is configured to generate a flow of a pilot fluid. The direction control valve is configured to control the flow of the pilot fluid to the displacement actuator to affect a movement direction of the displacement actuator. The pressure control valve is configured to control a pressure of the pilot fluid to affect a movement amount of the displacement actuator. Further, the hydraulic circuit includes a controller. The controller is configured to control the direction and the pressure control valves to adjust a displacement of the primary pump based at least on one of a sensed engine parameter or a mode of operation of the primary pump.

In another aspect, the disclosure provides a method for controlling a hydraulic circuit. The method receives one or more signals from a plurality of sensors. The method determines a displacement setting of a displacement actuator associated with a primary pump. The method then issues a command to move a pressure control valve between a first position and a second position to vary a pressure of the pilot fluid based at least in part on the determined displacement setting. Subsequently, the method issues a command to move a direction control valve to provide a pilot fluid flow to one end of the displacement actuator while connecting another end of the displacement actuator to a low pressure sump via the direction control valve.

Other features and aspects of this disclosure will be apparent from the following description and the accompanying drawings.

DETAILED DESCRIPTION

Figure 1:
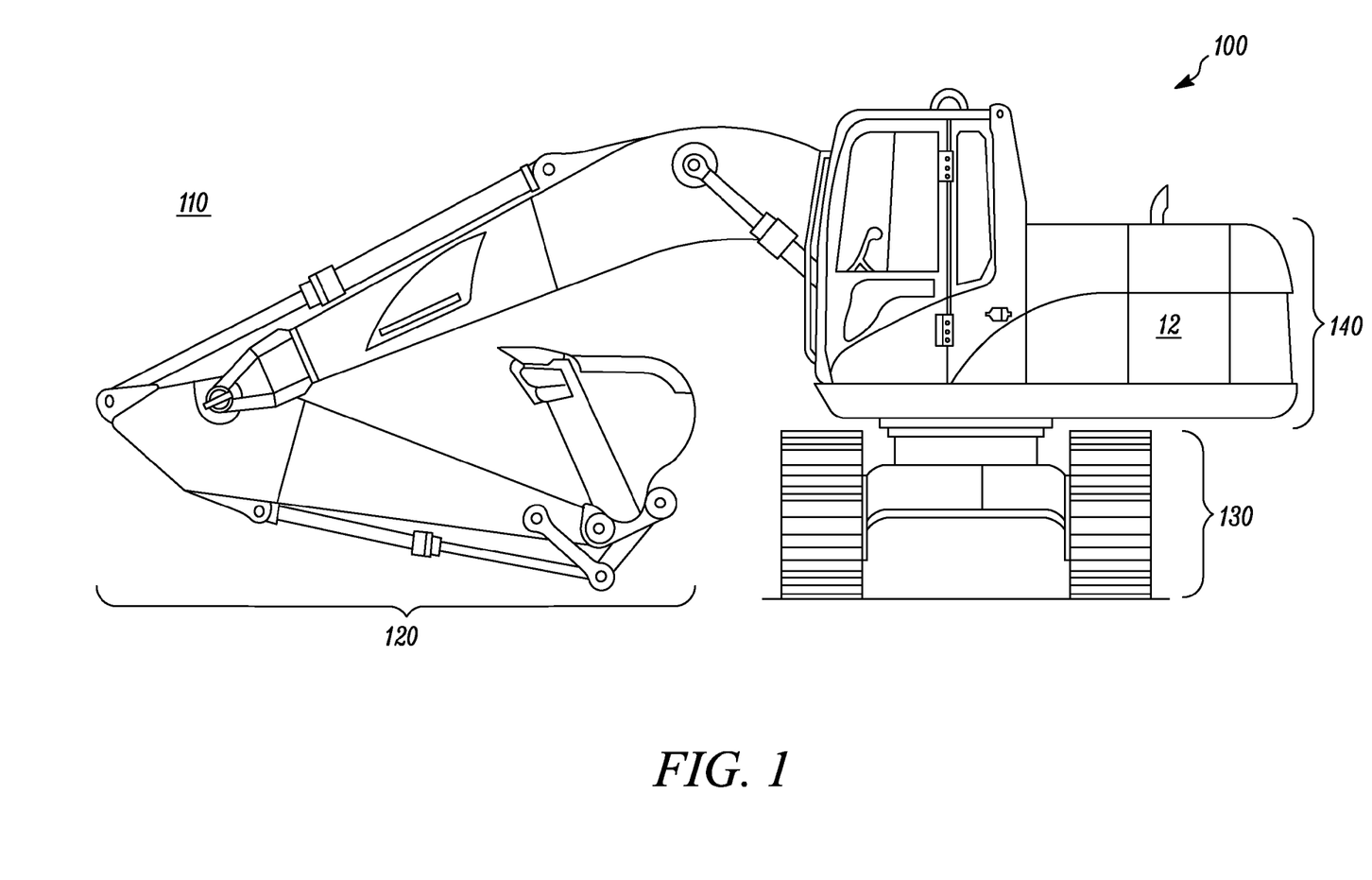
FIG. 1 is a pictorial illustration of an exemplary disclosed excavation machine.

FIG. 1 illustrates an exemplary machine 100 performing a particular function at a worksite 110. Machine 100 may embody a stationary or mobile machine, with the particular function being associated with an industry such as mining, construction, farming, transportation, power generation, oil and gas, or any other industry known in the art. For example, machine 100 may be an earth moving machine such as the excavator depicted in FIG. 1, in which the particular function includes the removal of earthen material from worksite 110 that alters the geography of worksite 110 to a desired form. Machine 100 may alternatively embody a different earth moving machine such as a motor grader or a wheel loader, or a non-earth moving machine such as a passenger vehicle, a stationary generator set, or a pumping mechanism. Machine 100 may embody any suitable operation-performing machine.

Machine 100 may be equipped with multiple systems that facilitate the operation of machine 100 at worksite 110, for example a tool system 120, a drive system 130, and an engine system 140 that provides power to tool system 120 and drive system 130. During the performance of most tasks, power from engine system 140 may be disproportionately split between tool system 120 and drive system 130. That is, machine 100 may generally be either traveling between excavation sites or primarily supplying power to drive system 130, or parked at an excavation site and actively moving material by primarily supplying power to tool system 120. Machine 100 generally will not be traveling at high speeds and actively moving large loads of material with tool system 120 at the same time. Accordingly, engine system 140 may be sized to provide enough power to satisfy a maximum demand of either tool system 120 or of drive system 130, but not both at the same time. Although sufficient for most situations, there may be times when the total power demand from machine systems (e.g., from tool system 120 and/or drive system 130) exceeds a power supply capacity of engine system 140. Engine system 140 may be configured to recover stored energy during these times to temporarily increase its supply capacity. This additional supply capacity may also or alternatively be used to reduce a fuel consumption of engine system 140 by allowing for selective reductions in the power production of engine system 140, if desired.

Figure 2:
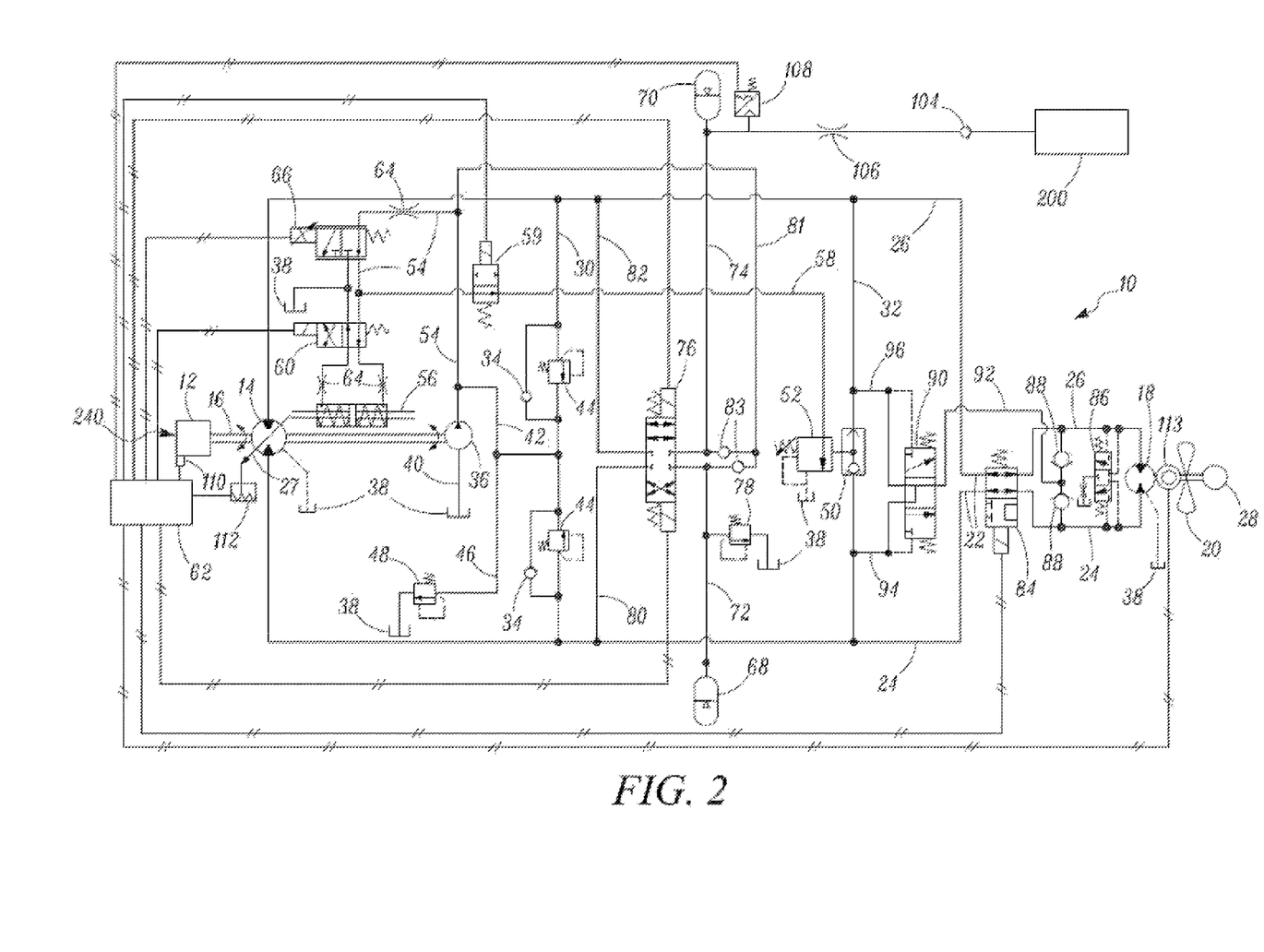
FIG. 2 is a schematic illustration of an exemplary disclosed hydraulic circuit that may be utilized in conjunction with the excavation machine of FIG. 1.
Figure 3:
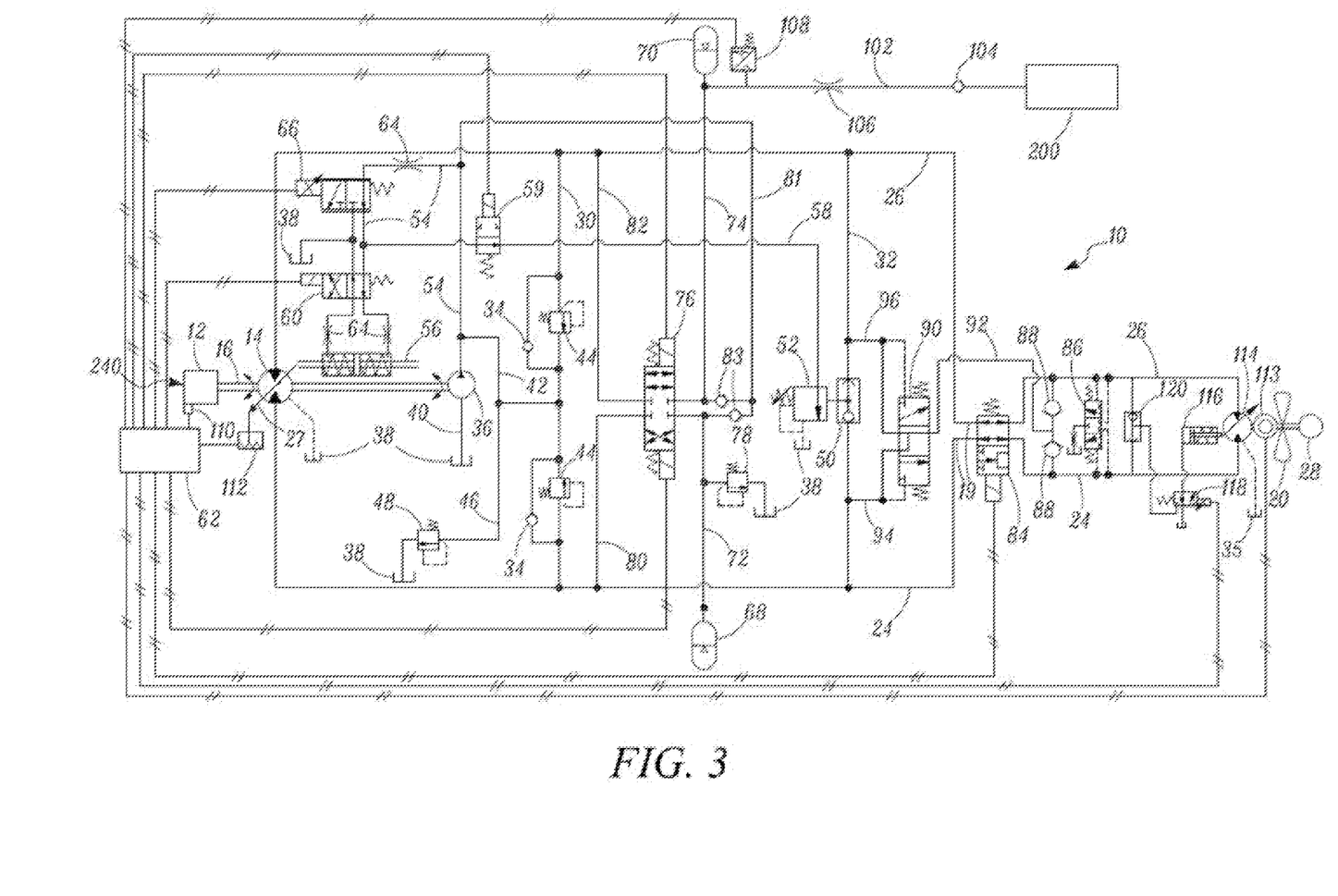
FIG. 3 is a schematic illustration of another exemplary disclosed hydraulic circuit that may be used in conjunction with the excavation machine of FIG. 1.

Engine system 140 may include a heat engine 12, for example an internal combustion engine, equipped with a hydraulic circuit 10, as illustrated in relation to FIG. 2 and FIG. 3. Hydraulic circuit 10 may include a collection of components that are powered by engine 12 to cool engine 12.

Referring now to FIG. 2, hydraulic circuit 10 may include a primary pump 14 connected directly to a mechanical output 16 of engine 12, a motor 18 fluidly connected to primary pump 14 by a closed-loop circuit 22, and a fan 20 connected to motor 18. Engine 12 may drive primary pump 14 via mechanical output 16 to draw in low-pressure fluid and discharge the fluid at an elevated pressure. Motor 18 may receive and convert the pressurized fluid to mechanical power that drives fan 20 to generate a flow of air. The flow of air may be used to cool engine 12 directly and/or indirectly by way of a heat exchanger (not shown). The flow of air may also be used to cool hydraulic systems, fuel systems, transmissions, and/or air conditioning systems directly or indirectly.

Primary pump 14 includes an over-center, variable-displacement or variable-delivery pump which may be driven by engine 12 to pressurize fluid. Primary pump 14 may embody a rotary or piston-driven pump having a crankshaft (not shown) connected to engine 12 via mechanical output 16 such that an output rotation of engine 12 results in a corresponding pumping motion of primary pump 14. The pumping motion of primary pump 14 may function to draw in low-pressure fluid expelled from motor 18 via a low-pressure passage 24, and discharge the fluid at an elevated pressure to motor 18 via a high-pressure passage 26. Low- and high-pressure passages 24, 26 together may form closed circuit 22. Primary pump 14 may be dedicated to supplying pressurized fluid to only motor 18 via high-pressure passage 26 or, alternatively, may also supply pressurized fluid to other hydraulic circuits associated with machine 100 (e.g., to hydraulic circuits associated with tool system 120, drive system 130, etc.), if desired. Similarly, primary pump 14 may be dedicated to drawing low-pressure fluid from only motor 18 via low-pressure passage 24 or, alternatively, may also draw in low-pressure fluid from other hydraulic circuits of machine 100, if desired.

Primary pump 14 includes a variable angle swash-plate 27 to vary the displacement of the primary pump 14. Specifically, a number of pistons (not shown in the figure) in respective chambers of primary pump 14 ride on the swash-plate 27 via sliding contacts, such that the range of movement of the pistons is set by an angle of swash-plate 27. The chambers for the pistons are formed in a pump carrier that is rotated via the mechanical output 16. In an embodiment, torque or output speed of motor 18 varies with the angle of swash-plate 27. It should be noted that, in some situations, primary pump 14 and motor 18 may be operated in reverse direction and, in these situations, the pressures within low- and high-pressure passages 24, 26 may be reversed.

Motor 18 may include a fixed displacement, rotary- or piston-type hydraulic motor movable by an imbalance of pressure acting on a driven element (not shown), for example an impeller or a piston. Fluid pressurized by primary pump 14 may be directed into motor 18 via high-pressure passage 26 and returned from motor 18 via low-pressure passage 24. The direction of pressurized fluid to one side of the driven element and the draining of fluid from an opposing side of the driven element may create a pressure differential across the driven element (not shown) that causes the driven element to move or rotate. The direction and rate of fluid flow through motor 18 may determine the rotational direction and speed of motor 18 and fan 20, while the pressure imbalance of motor 18 may determine the torque output.

Fan 20 may be disposed proximate a liquid-to-air or air-to-air heat exchanger (not shown) and configured to produce a flow of air directed through channels of the exchanger for heat transfer with coolant or combustion air therein. Fan 20 may include a plurality of blades connected to motor 18 and be driven by motor 18 at a speed corresponding to a desired flow rate of air and/or a desired engine coolant temperature. The desired flow of air may also be affected by cooling demands of hydraulic systems, fuel systems, transmissions, and/or air conditioning systems. In one embodiment, a flywheel 28 may be connected to one of fan 20 and motor 18 to rotate therewith. Flywheel 28 may embody a fixed inertia flywheel, a variable inertia flywheel, or another type of flywheel known in the art having one or more rotating masses that move in accordance with a rotation of motor 18 and fan 20. The inertia of flywheel 28 may be selected to increase a free-spinning time of fan 20 after primary pump 14 has stopped driving motor 18. Under most conditions, a typical closed circuit fan may stop spinning after about 3 seconds or less, when no longer driven by a pump. Flywheel 28, however, may have an inertia great enough to cause fan 20 to spin for at least 4 seconds after primary pump 14 has stopped driving motor 18. In another embodiment, flywheel 28 may be incorporated into fan 20 (i.e., fan 20 may be oversized to include the inertia of flywheel 28 that causes it to spin for the at least 4 seconds).

Low- and high-pressure passages 24, 26 may be interconnected via multiple different crossover passages. In the exemplary embodiment, two different crossover passages interconnect low- and high-pressure passages 24, 26, including a makeup/relief passage 30 and a pressure limiting passage 32. Makeup/relief passage 30 may provide makeup fluid to low- and/or high-pressure passages 24, 26 to help ensure that hydraulic circuit 10 remains full of fluid, and also provide a leak path for high-pressure fluid within low- and/or high-pressure passages 24, 26 such that damage to the components of hydraulic circuit 10 may be avoided. Pressure-limiting passage 32 may provide for pilot pressure control associated with a displacement of primary pump 14.

One or more makeup valves 34, for example check valves, may be located within makeup/relief passage 30 to selectively connect the output from a charge pump 36 with low- and/or high-pressure passages 24, 26 based on pressures of fluid in the different passages. That is, when a pressure within low- and/or high-pressure passage 24, 26 falls below a pressure of fluid discharged by charge pump 36, makeup valve(s) 34 may open and allow fluid to pass from charge pump 36 into the respective passage(s). Charge pump 36 may be driven by engine 12 to rotate with primary pump 14 and draw in fluid from a low-pressure sump 38 via a tank passage 40, and discharge the fluid into makeup/relief passage 30 via a valve passage 42.

One or more relief valves 44 may also be located within makeup/relief passage 30. Relief valves 44 may be spring-biased and movable in response to a pressure of low- and/or high-pressure passages 24, 26 to selectively connect the respective passages with a low-pressure passage 46, thereby relieving excessive fluid pressures within low- and high-pressure passages 24, 26. An additional spring-biased pressure relief valve 48 may be located within low-pressure passage 46 and selectively moved by a pressure within low-pressure passage 46 between flow-passing and flow blocking (shown in FIG. 2) positions such that a desired pressure within low-pressure passage 46 may be maintained.

A resolver 50 may be disposed within pressure-limiting passage 32 and associated with a pilot pressure limiter 52. Resolver 50 may be configured to connect fluid from the one of low- and high-pressure passages 24, 26 having the greater pressure with pilot pressure limiter 52. In most instances, resolver 50 connects the pressure from high-pressure passage 26 with pilot pressure limiter 52 (shown in FIG. 2). However, when primary pump 14 and motor 18 are operating in the reverse flow direction or during an overrunning condition of motor 18, it may be possible for the pressure within low-pressure passage 24 to exceed the pressure within high-pressure passage 26. Under these conditions, resolver 50 may move to connect the pressure from low-pressure passage 24 with pilot pressure limiter 52. When the pressure of fluid passing through resolver 50 exceeds a threshold limit, pilot pressure limiter 52 may move from a flow-blocking position toward a flow passing position. It is contemplated that the threshold limit of pilot pressure limiter 52 may be tunable, if desired, to adjust a responsiveness or performance of hydraulic circuit 10.

Pilot pressure limiter 52 may be in fluid communication with a pilot passage 54 that extends between charge pump 36 and a displacement actuator 56 of primary pump 14. Specifically, pilot pressure limiter 52 may be connected to pilot passage 54 via a passage 58. When pilot pressure limiter 52 moves toward the flow-passing position described above, pilot fluid from within pilot passage 54 may be allowed to drain to low-pressure sump 38. The draining of pilot fluid from pilot passage 54 may reduce a pressure of fluid within pilot passage 54.

The pilot fluid in passage 54 may be selectively communicated with displacement actuator 56 to affect a displacement change of primary pump 14. Displacement actuator 56 may embody a double-acting, spring-biased cylinder connected to move swash-plate 27 to change the displacement of primary pump 14. Specifically, displacement actuator 56 controls the position of variable-angle swash plate 27 in primary pump 14 to effect a change in the displacement of primary pump 14. The displacement actuator 56 may include a number of interrelated elements including primarily two opposed pistons (or opposed chambers of a single piston) within respective cylinders of displacement actuator 56. The positions of the pistons are determined, at least in part, by the difference in hydraulic pressure between the piston chambers. The position of the pistons further controls the angle of swash-plate 27 of primary pump 14 and thus, the displacement of primary pump 14.

In an embodiment, controller 62 independently controls the position of the pistons on respective side of displacement actuator 56, at least in part, by controlling a pressure control valve 66 associated with the pilot passage 54 and displacement actuator 56. Pressure control valve 66 varies the pressure of fluid in pilot passage 54 based on an amount of electric current passed through a solenoid actuator of pressure control valve 66. In an embodiment, controller 62 is communicably coupled with a swash-plate angle sensor 112, which generates a signal indicative of the current angle of the swash-plate 27. Based on signals from various sensors such as pressure sensor 108, one or more engine sensors 110, swash-plate angle sensor 112, and a motor speed sensor 113, controller 62 may move pressure control valve 66 from a first position (shown in FIG. 2) at which full charge pressure is passed through one end of displacement actuator 56, toward a second position at which some of the charge pressure is vented to low-pressure sump 38 before reaching the one end of displacement actuator 56. In an embodiment, while one end of displacement actuator 56 receives pilot fluid through pressure control valve 66, the other end of displacement actuator is connected to low pressure sump 38.

Pressure control valve 66 may be movable from the first position against a spring bias toward the second position based on a current command provided from controller 62. It is contemplated that pressure control valve 66 may be directly controlled via a solenoid (shown in FIG. 2) or, alternatively, pilot operated via a separate solenoid valve (not shown), as desired. By selectively moving pressure control valve 66 to any position between the first and second positions, controller 62 may control the pressure on one end of the displacement actuator 56 which creates a hydraulic pressure differential between the piston chambers of displacement actuator 56. The hydraulic pressure differential results in a net force acting on the pistons of displacement actuator 56 which in turn changes the angle of the swash-plate 27 and thus, the displacement of primary pump 14.

In an embodiment, controller 62 further controls which end of displacement actuator 56 receives the pressurized pilot fluid and, accordingly, in which direction (i.e., which of a displacement-increasing and a displacement-decreasing direction) swash-plate 27 of primary pump 14 is moved by displacement actuator 56. Controller 62 may control a directional control valve 60 associated with displacement actuator 56 to control what end of displacement actuator 56 receives the pressurized pilot fluid. The pressurized pilot fluid received from pressure control valve 66 passes through the directional control valve 60 before reaching displacement actuator. Directional control valve 60 may be a spring-biased, solenoid-actuated control valve that is movable based on a command from controller 62. The command from controller 62 is the current command provided to solenoid based directional control valve 60 to move the valve 60 from a first position to a second position.

Directional control valve 60 may move between the first position at which a first end of displacement actuator 56 receives the pressurized pilot fluid, and the second position at which a second opposing end of displacement actuator 56 receives the pressurized pilot fluid. When the first end of displacement actuator 56 is receiving pressurized pilot fluid (i.e., when directional control valve 60 is in the first position), the second end of displacement actuator 56 may be simultaneously connected to low-pressure sump 38 via directional control valve 60. Similarly, when the second end of displacement actuator 56 is receiving pressurized pilot fluid (i.e., when directional control valve 60 is in the second position), the first end of displacement actuator 56 may be simultaneously connected to low-pressure sump 38 via directional control valve 60.

In an embodiment, based on the signal from pressure sensor 108, controller 62 may determine the mode of operation of primary pump 14, and thus, command direction control valve 60 to enable which end of displacement actuator 56 receives the pressured pilot fluid.

One or more restrictive orifices 64 may be associated with pilot passage 54 to reduce pressure fluctuations in the pilot fluid entering and exiting the ends of displacement actuator 56 and, thereby, stabilize fluctuations in a speed of pump displacement changes.

When pilot fluid of a sufficient pressure is introduced into one end of displacement actuator 56, displacement actuator 56 may move swash-plate 27 of primary pump 14 by an amount corresponding to the pressure of the fluid. Pilot pressure limiter 52 may limit the pressure within pilot passage 54 based on a pressure of fluid within low- and high-pressure passages 24, 26 and, accordingly, also limit the displacement of primary pump 14.

In some situations, it may be desirable to inhibit the pressure limiting provided by pilot pressure limiter 52, for example when an extreme displacement position of primary pump 14 is desired. For this reason, a pressure override valve 59 may be disposed within passage 58, between pilot pressure limiter 52 and pilot passage 54. Pressure override valve 59 may be a spring-biased, solenoid-actuated control valve that is movable based on a command from a controller 62. Pressure override valve 59 may be movable between a flow-passing position (shown in FIG. 2) at which pilot passage 54 is in fluid communication with pilot pressure limiter 52 via passage 58, and a flow blocking position at which fluid communication via passage 58 is inhibited. Pressure override valve 59 may be spring-biased toward the flow-passing position.

At least one accumulator may be associated with closed circuit 22. In the embodiment of FIG. 2, two accumulators are illustrated, including a low-pressure accumulator 68 and a high-pressure accumulator 70. A low-pressure discharge passage 72 and a high-pressure discharge passage 74 may extend from low- and high-pressure accumulators 68, 70, respectively, to a discharge control valve 76. A pressure relief valve 78 may be associated with low-pressure discharge passage 72, if desired, to selectively relieve fluid from low-pressure accumulator 68 to low-pressure sump 38 and thereby maintain a desired pressure within low-pressure accumulator 68. Discharge control valve 76 may be fluidly connected to low- and high-pressure passages 24, 26 by way of passages 80 and 82 respectively.

Discharge control valve 76 may be a double-acting, spring-biased, solenoid-controlled valve that is movable between three distinct positions based on a command from controller 62. In the first position (shown in FIG. 2), fluid flow through discharge control valve 76 may be inhibited. In the second position, fluid may be allowed to pass between low-pressure accumulator 68 and low-pressure passage 24 and between high-pressure accumulator 70 and high-pressure passage 26. In the third position, fluid may be allowed to pass between low-pressure accumulator 68 and high-pressure passage 26 and between high-pressure accumulator 70 and low-pressure passage 24. Discharge control valve 76 may be spring-biased to the first position.

Low- and high-pressure accumulators 68, 70 may be in fluid communication with pilot passage 54. Specifically, a fill passage 81 may fluidly connect each of low- and high-pressure discharge passages 72, 74 to pilot passage 54. A check valve 83 may be disposed within fill passage 81 between pilot passage 54 and each of low- and high-pressure accumulators 68, 70 to help ensure a unidirectional flow of fluid from charge pump 36 into low- and high-pressure accumulators 68, 70.

High-pressure accumulator 70 may also be in fluid communication with another hydraulic circuit 200 that forms a portion of, for example, tool system 120, drive system 130, or another system of machine 100. In particular, an auxiliary supply passage 102 may fluidly connect hydraulic circuit 200 to high-pressure accumulator 70 to fill high-pressure accumulator 70 with waste or excess fluid having an elevated pressure. A check valve 104 and a restrictive orifice 106 may be disposed within auxiliary supply passage 102 to help provide for a unidirectional flow of fluid with damped oscillations from hydraulic circuit 200 into high-pressure accumulator 70. Sensor 108, for example a pressure sensor, temperature sensor, viscosity sensor, etc., may be associated with auxiliary supply passage 102 to provide a signal to controller 62 indicative of a fluid parameter of auxiliary supply passage 102 and/or high-pressure accumulator 70. Hydraulic circuit 200 may include a tool actuation circuit, a transmission circuit, a brake circuit, a steering circuit, or any other machine circuit known in the art.

During accumulator discharge, as will be described in greater detail below, it may be beneficial to substantially isolate motor 18 from low- and high-pressure passages 24, 26 (i.e., to substantially block direct fluid flow to motor 18 via low- and high-pressure passages 24, 26). For this reason, a fan isolation valve 84 may be fluidly connected to low- and high-pressure passages 24, 26, between motor 18 and low- and high-pressure accumulators 68, 70. Fan isolation valve 84 may be a spring-biased, solenoid-controlled valve that is movable between two distinct positions based on a command from controller 62. In the first position (shown in FIG. 2), fluid may be allowed to flow through fan isolation valve 84 to motor 18 via low- and high-pressure passages 24, 26. In the second position, fluid flow through fan isolation valve 84 may be inhibited. Fan isolation valve 84 may be spring-biased to the first position.

When motor 18 is isolated by fan isolation valve 84 (i.e., when fan isolation valve 84 is in the second position), fluid may still circulate through motor 18, and fan 20 may still be spinning. To help control fluid temperatures during this time, hydraulic circuit 10 may include a motor flushing valve 86 and a pair of check valves 88 in fluid communication with a motor makeup valve 90. Motor flushing valve 86 may be in fluid communication with isolated portions of low- and high-pressure passages 24, 26, and configured to move between three positions based on the pressures of fluid within these passages. In the first position (shown in FIG. 2), fluid flow from low- and high-pressure passages 24, 26 to low-pressure sump 38 may be inhibited. When a pressure difference occurs between low- and high-pressure passages 24, 26, motor flushing valve 86 may move to the second or third positions to remove a small volume of high-temperature fluid to be replaced with low-temperature oil. Check valves 88 may be located within a branching passage 92, between motor makeup valve 90 and low- and high-pressure passages 24, 26. Based on an imbalance of pressure between branching passage 92 and low- or high-pressure passages 24, 26, check valves 88 may open to allow additional fluid into the isolated portion of hydraulic circuit 10.

Motor makeup valve 90 may be disposed between pressure-limiting passage 32 and branching passage 92, and movable based on a pressure of fluid within pressure-limiting passage 32 to selective allow fluid into branching passage 92. In particular, fluid in a low-pressure makeup passage 94 connected to pressure-limiting passage 32 at a low-pressure side of resolver 50 may push on one end of motor makeup valve 90, while fluid in a high-pressure makeup passage 96 connected to pressure-limiting passage 32 at a high-pressure side of resolver 50 may push on an opposing end of motor makeup valve 90. The one of low- and high-pressure makeup passages 94, 96 having the higher pressure at a given point in time may urge motor makeup valve 90 to a position at which fluid from the lower pressure passage flows into branching passage 92. Motor makeup valve 90 may be spring biased toward a position at which fluid from both the low- and high-pressure makeup passages 94, 96 passes through to branching passage 92.

Controller 62 may embody a single or multiple microprocessors, field programmable gate arrays (FPGAs), digital signal processors (DSPs), etc. that include a means for controlling an operation of hydraulic circuit 10 in response to signals received from sensor 108, one or more engine sensors 110, swash-plate angle sensor 112, and a motor speed sensor 113. Numerous commercially available microprocessors can be configured to perform the functions of controller 62. It should be appreciated that controller 62 could readily embody a microprocessor separate from that controlling other machine-related functions, or that controller 62 could be integral with a machine microprocessor and be capable of controlling numerous machine functions and modes of operation. If separate from the general machine microprocessor, controller 62 may communicate with the general machine microprocessor via datalinks or other methods. Various other known circuits may be associated with controller 62, including power supply circuitry, signal-conditioning circuitry, actuator driver circuitry (i.e., circuitry powering solenoids, motors, or piezo actuators), and communication circuitry.

Controller 62 may be in communication with valves 59, 60, 66, 76, and 84 to control operations of hydraulic circuit 10 during at least two distinct modes of operation based on input from sensors 108, 110, 112, and 113. The modes of operation may include a normal mode during which primary pump 14 drives motor 18 to cool engine 12, and an energy recovery mode during which motor 18 drives primary pump 14 to recover energy directed back to engine 12. These modes of operation will be described in more detail in the following section to further illustrate the disclosed concepts FIG. 3 illustrates another embodiment of hydraulic circuit 10. In this embodiment, the fixed displacement motor 18 described above may be replaced with a variable displacement motor 114 having a displacement actuator 116 that controls a displacement of motor 114, a displacement control valve 118 that controls movement of displacement actuator 116, and a resolver 120 that controls fluid communication between low- and high-pressure passages 24, 26 and displacement control valve 118. Resolver 120 may be movable to allow fluid from the one of low- and high-pressure passages 24, 26 having the higher pressure at a given point in time to communicate with displacement control valve 118. Displacement control valve 118 may be movable based on a command from controller 62 between a first position at which all fluid from resolver 120 passes to displacement actuator 116, and a second position at which some or all of the fluid from resolver 120 is blocked before it reaches displacement actuator 116. Movement of displacement control valve 118 between the first and second positions may affect a pressure of the fluid acting on displacement actuator 116 and, subsequently, movement of displacement actuator 116. Displacement actuator 116 may be a single-acting, spring-biased cylinder configured to adjust a displacement of motor 114 when exposed to fluid of a particular pressure. Motor 114, by having an adjustable displacement, may provide additional functionality during accumulator discharge not otherwise available with a fixed-displacement motor, as will be described in more detail below. It is contemplated that motor 114 may be an over-center motor, if desired.

Industrial Applicability

During the normal mode of operation, engine 12 may drive primary pump 14 to rotate and pressurize fluid. The pressurized fluid may be discharged from primary pump 14 into high-pressure passage 26 and directed into motor 18. As the pressurized fluid passes through motor 18, hydraulic power in the fluid may be converted to mechanical power used to rotate fan 20 and flywheel 28. As fan 20 rotates, a flow of air may be generated that facilitates cooling of engine 12. Fluid exiting motor 18, having been reduced in pressure, may be directed back to primary pump 14 via low-pressure passage 24 to repeat the cycle.

During the normal mode of the operation, controller 62 controls the position of the variable-angle swash plate 27 in primary pump 14 to effect a change in the displacement of primary pump 14. The fluid discharge direction and displacement of pump 14 during the normal mode of operation may be regulated based on signals from sensors 108, 110, 112, and/or 113, for example based on an engine speed signal, an engine temperature signal, a motor speed signal, a pump displacement signal, an accumulator pressure signal, and/or another similar signal. Controller 62 may receive these signals and reference a corresponding engine speed, engine temperature, swash-plate angle, motor speed, accumulator pressure, or other similar parameter with one or more lookup maps stored in memory to determine a desired discharge direction and displacement setting of primary pump 14 and a corresponding rotation direction and speed of fan 20. In an embodiment, controller 62 receive signals related to the engine cooling requirement, based on which controller 62 may determine a required swash-plate angle to yield a displacement of primary pump 14 to match the cooling requirement.

In an embodiment, controller 62 may issue current commands to the solenoid of both pressure control valve 66 and direction control valve 60 to match the reference swash-plate angle. Controller 62 may receive the current angle of swash-plate 27 from the swash-plate angle sensor 112 and correspondingly, issue electric current commands to both pressure control valve 66 and direction control valve 60 to match the reference swash-plate angle. The electric current command from controller 62 moves pressure control valve 66 from the first position at which full charge pressure is passed through one end of displacement actuator 56, toward a second position at which some of the charge pressure is vented to low-pressure sump 38 before reaching through direction control valve 60 to one end of displacement actuator 56. In an embodiment, while one end of displacement actuator 56 receives pilot fluid through direction control valve 60, the other end of displacement actuator is connected to low pressure sump 38. By selectively moving pressure control valve 66 to any position between the first and second positions, controller 62 may control the pressure on one end of the displacement actuator 56 which creates a hydraulic pressure differential between the piston chambers of displacement actuator 56. The hydraulic pressure differential results in net force acting on the pistons of displacement actuator 56 which in turn changes the angle of the swash-plate 27 and thus, the displacement of primary pump 14. This may result in achieving a displacement of primary pump 14 that ensures a proper cooling of engine system 140 and being fuel efficient at the same time.

The current command from controller 62 to direction control valve 60 further controls which end of displacement actuator 56 receives the pressurized pilot fluid and, accordingly, in which direction (i.e., which of a displacement-increasing and a displacement-decreasing direction) swash-plate 27 of primary pump 14 is moved by displacement actuator 56.

In an embodiment, if the electrical control is lost and controller 62 cannot provide current to the solenoids on valve 60,66, then pressure control valve 66, being normally open, passes pilot pressure to one end of displacement actuator 56, while the other end is connected to low pressure sump 38. This may result in a hydraulic pressure differential between the piston chambers of displacement actuator 56. The hydraulic pressure difference results in a net force acting on the pistons of displacement actuator 56 which, in failure of electrical control, increase the angle of swash-plate 27 to maximum and thus, primary pump 14 operates at maximum displacement. Thus, it is ensured that even when the electrical control is lost, sufficient cooling of the components of the machine 100 may be achieved.

Due to wear, environmental factors, or other circumstances, electrical connections to either the solenoid of valve 66, or the solenoid of valve 60 may fail. These electrical connections control the displacement of swashplate 27 angle and thus the cooling output of fan 20, through pump 14, and motor 18. It is desireable that if the electrical connections fail, the fan 20 continue to provide cooling to engine 12 to prevent overheating and expensive mechanical failures.

If the electrical connection between controller 62 and the solenoid of valve 66 fails, valve 66 moves to spring biased first position which allows the full pressure from pilot passage 54 to pass through valve 66 to directional valve 60. When valve 66 allows full charge pressure to reach the swashplate actuator 56, the actuator 56 moves the swashplate 27 to allow maximum displacement of pump 14. At maximum displacement, pump 14 provides power to fan 20 to operate at maximum speed, providing cooling to the engine 12, when pump 14 is in the pumping mode; and provides full power return to engine 12, when pump 14 is in motoring mode.

If the electrical connection between controller 62 and the solenoid of directional valve 60 fails, valve 60 moves to the spring biased default position shown in FIG. 2 and FIG. 3.

When valve 60 is in this default position, actuator 56 controls the swashplate 27 to keep pump 14 in pumping mode and powering fan 20.

It will be apparent to those skilled in the art that various modifications and variations can be made to the disclosed hydraulic circuit. For example, although the disclosed pumps and motors are described as being variable and fixed displacement or variable and variable displacement type devices, respectively, it is contemplated that the disclosed pumps and motors may alternatively both be fixed displacement type devices, if desired. Other embodiments will be apparent to those skilled in the art from consideration of the specification and practice of the disclosed hydraulic circuit. It is intended that the specification and examples be considered as exemplary only, with a true scope being indicated by the following claims and their equivalents.

What is claimed is:

1. A hydraulic circuit comprising:
    a primary pump;
    a displacement actuator associated with the primary pump;
    a charge pump configured to generate a flow of a pilot fluid;
    a direction control valve configured to control the flow of the pilot fluid to the displacement actuator to affect a movement direction of the displacement actuator;
    a pressure control valve configured to control a pressure of the pilot fluid to affect a movement amount of the displacement actuator;
    a motor;
    a fan connected to and driven by the motor;
    a high pressure passage fluidly connected between the motor and the primary pump;
    a low pressure passage fluidly connected between the motor and the primary pump;
    at least one accumulator in selective fluid communication with at least one of the high- and low- pressure passages;
    a fan isolation valve connected between the high pressure passage and the motor, and between the low pressure passage and the motor, the fan isolation valve being configured to selectively isolate portions of the high and low pressure passages between the fan isolation valve and the motor;
    a motor flushing valve selectively connected between the isolated portions of the high and low pressure passages and a low pressure sump; and
    a controller being configured to control the direction and the pressure control valves to adjust a displacement of the primary pump based at least on one of a sensed engine parameter or a mode of operation of the primary pump.

2. The hydraulic circuit of claim 1, wherein the direction control valve is configured to supply the pilot fluid to a first end of the displacement actuator while a second end of the displacement actuator is connected to a low pressure sump via the direction control valve.

3. The hydraulic circuit of claim 2 further includes one or more restrictive orifices in a path of a pilot fluid flow between the direction control valve and the displacement actuator.

4. The hydraulic circuit of claim 1, wherein the primary pump is a variable displacement pump.

5. The hydraulic circuit of claim 1, wherein the direction and pressure control valves are solenoid-controlled valves.

6. The hydraulic circuit of claim 1, wherein the pressure control valve is a normally open pressure reducing valve.

7. The hydraulic circuit of claim 1, wherein the at least one accumulator includes:
    a high-pressure accumulator associated with the high-pressure passage; and
    a low-pressure accumulator associated with the low-pressure passage.

8. The hydraulic circuit of claim 7, further including a discharge valve in fluid communication with the high- and low-pressure accumulators, the discharge valve being configured to:
    selectively pass fluid from the primary pump to the high-pressure accumulator and from the high-pressure accumulator to the primary pump; and
    selectively pass fluid from the motor to the low-pressure accumulator and from the low-pressure accumulator to the primary pump.

9. The hydraulic circuit of claim 8, wherein the discharge valve is a solenoid-controlled valve.

10. The hydraulic circuit of claim 1, further including a discharge valve in fluid communication with the at least one accumulator and configured to selectively pass fluid from the primary pump to the at least one accumulator and from the at least one accumulator to the primary pump.

11. The hydraulic circuit of claim 10, wherein the at least one accumulator is further configured to receive fluid from another hydraulic circuit.

12. The hydraulic circuit of claim 1 further including:
    at least one makeup valve disposed between the high- and low-pressure passages; and
    at least one pressure relief valve disposed between the high- and low-pressure passages.

13. The hydraulic circuit of claim 12 further includes a pressure limiting valve in fluid communication with the at least one pressure relief valve and the direction control valve.

14. The hydraulic circuit of claim 1, wherein the charge pump is connected to the primary pump and driven by a combustion engine.

15. The hydraulic circuit of claim 1 further includes a pilot relief valve in fluid communication with the direction control valve.

16. The hydraulic circuit of claim 13 further includes a pressure resolver configured to fluidly communicate the high-pressure passage with the pilot relief valve.

17. The hydraulic circuit of claim 1 further includes a pressure limiter override valve in fluid communication with the direction control valve.

18. A method comprising:
    receiving one or more signals from a plurality of sensors;
    determining a displacement setting of a displacement actuator associated with a primary pump;
    issuing a command to move a pressure control valve between a first position and a second position to vary a pressure of pilot fluid provided to the pressure control valve by a charge pump based at least in part on the determined displacement setting;
    issuing a command to move a direction control valve to provide a pilot fluid flow to one end of the displacement actuator while connecting another end of the displacement actuator to a low pressure sump via the direction control valve;
    isolating a fan driven by a motor that receives pressurized fluid from the primary pump by selectively inhibiting the flow of pressurized fluid from the primary pump through an isolated portion of a high pressure passage to the motor and from the motor back through an isolated portion of a low pressure passage to the primary pump; and
    selectively inhibiting the flow of pressurized fluid from the isolated portions of at least one of the high pressure passage and the low pressure passage to a low pressure sump.

19. A computer based system for controlling a hydraulic circuit comprising:
- a communication interface communicating with a memory;
- the memory configured to communicate with a processor for controlling a displacement actuator in the hydraulic circuit; and
- the processor, in response to executing a computer program, performs operations comprising:
- receiving one or more signals from a plurality of sensors;
- determining a displacement setting of a displacement actuator associated with a primary pump;
- issuing a command to move a pressure control valve between a first position and a second position to vary a pressure of pilot fluid provided to the pressure control valve by a charge pump based at least in part on the determined displacement setting;
- issuing a command to move a direction control valve to provide a pilot fluid flow to one end of the displacement actuator while connecting another end of the displacement actuator to a low pressure sump via the direction control valve;
- isolating a fan driven by a motor that receives pressurized fluid from the primary pump by selectively inhibiting the flow of pressurized fluid from the primary pump through an isolated portion of a high pressure passage to the motor and from the motor back through an isolated portion of a low pressure passage to the primary pump; and
- selectively inhibiting the flow of pressurized fluid from the isolated portions of at least one of the high pressure passage and the low pressure passage to a low pressure sump.

* * * * *